Dec. 7, 1943.   P. F. HACKETHAL   2,336,012
PROPELLER
Filed Sept. 10, 1940   3 Sheets-Sheet 2
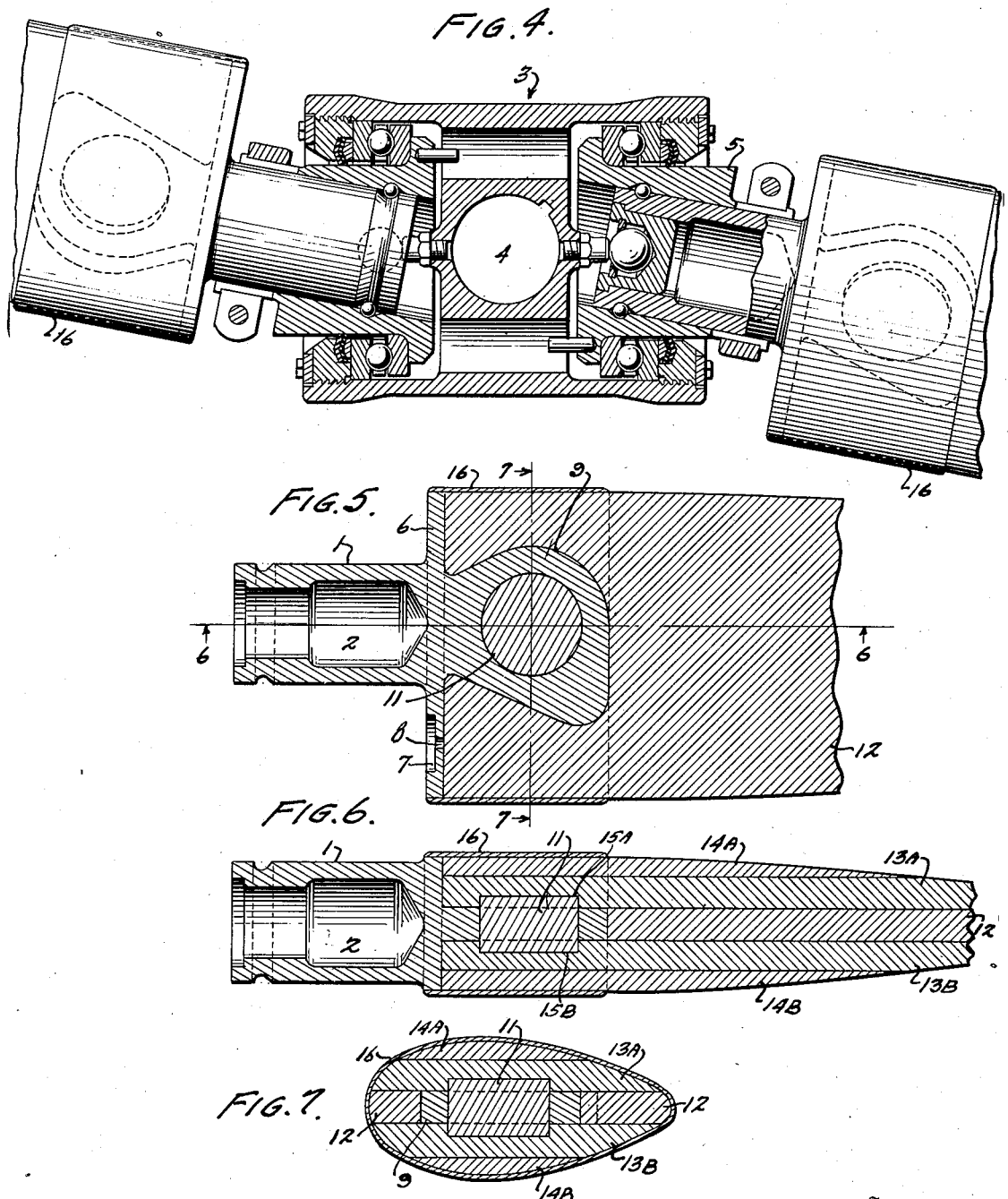
Inventor
PAUL F. HACKETHAL
By Semmes, Keegin & Semmes
Attorneys Dec. 7, 1943. P. F. HACKETHAL 2,336,012
PROPELLER
Filed Sept. 10, 1940  3 Sheets-Sheet 3
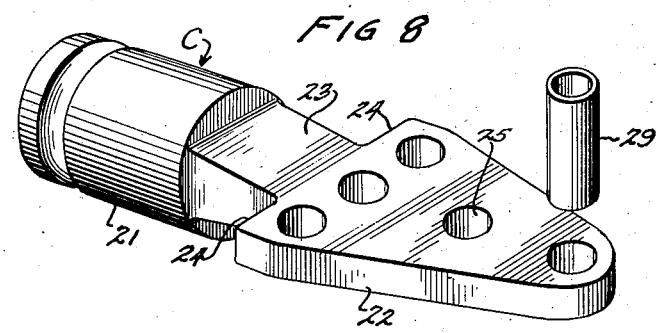
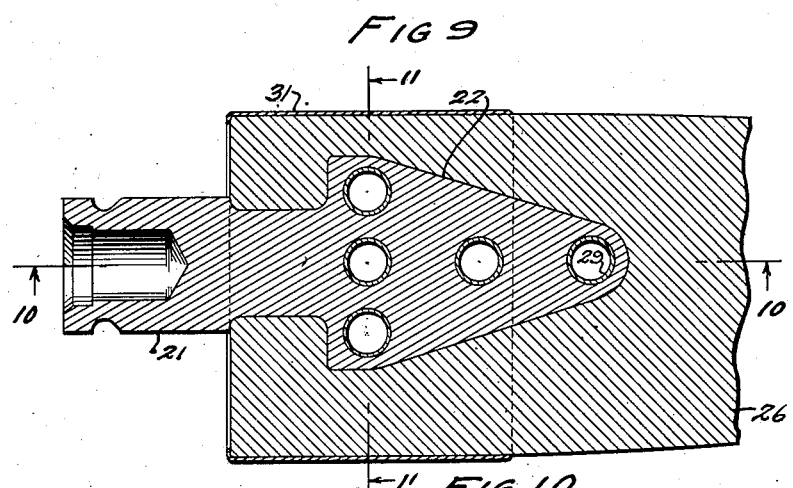
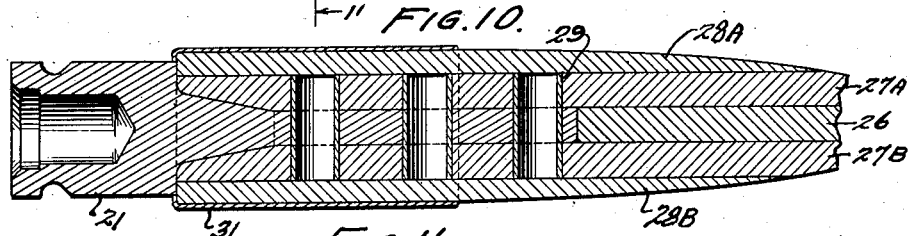
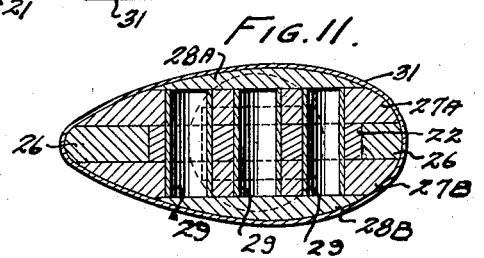
Inventor
PAUL F. HACKETHAL
By Semmes, Keegin & Semmes
Attorneys Patented Dec. 7, 1943

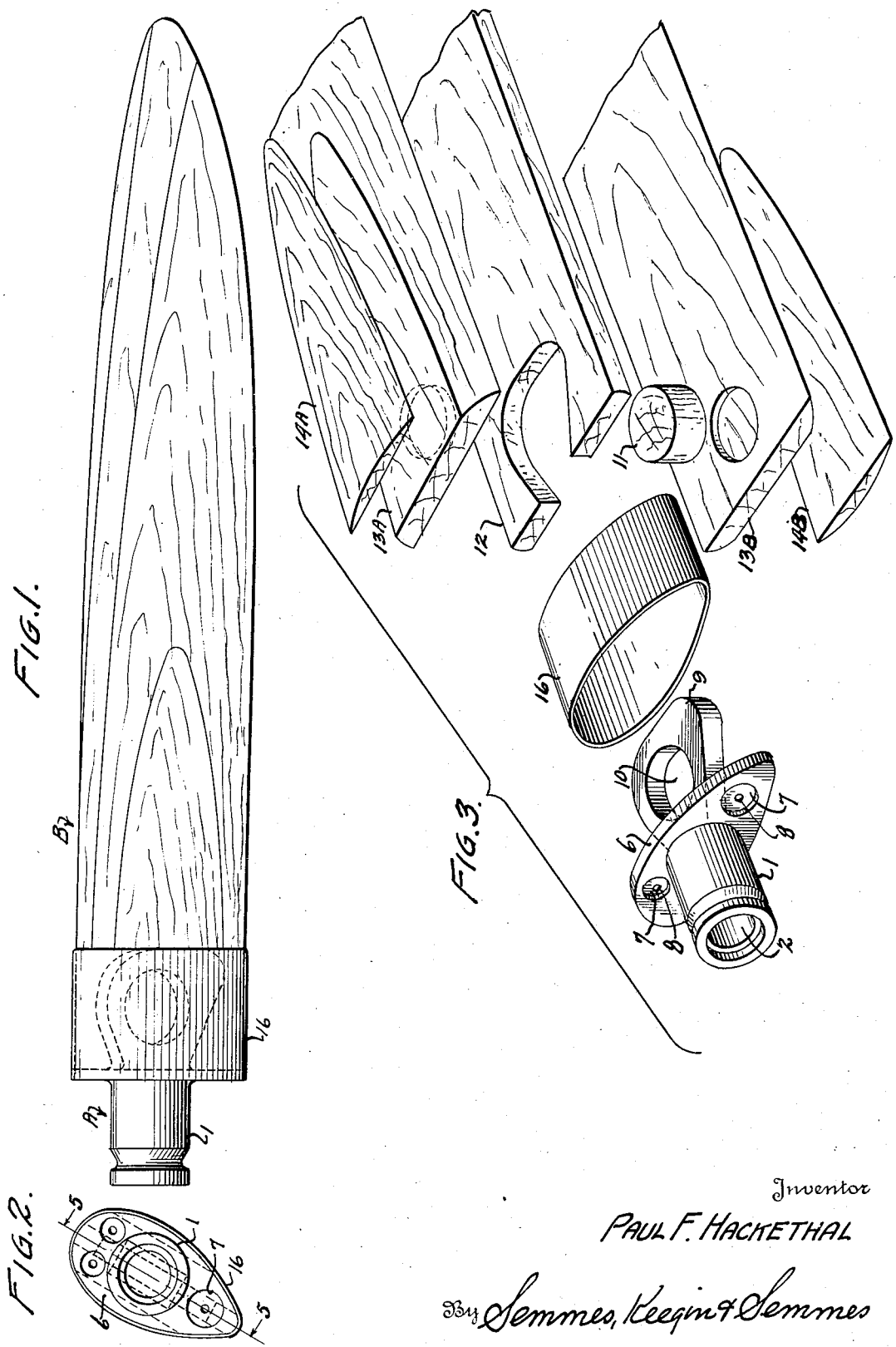

2,336,012

UNITED STATES PATENT OFFICE 2,336,012

PROPELLER

Paul F. Hackethal, Baltimore, Md., assignor to Everel Propeller Corporation, Baltimore, Md., a corporation of Maryland Application September 10, 1940, Serial No. 356,226

6 Claims. (Cl. 170—173)

This invention relates to propellers, and more particularly has reference to a shank for an airplane propeller. The shank in question is for use especially with a non-metallic propeller blade, such as for instance one composed of laminated wood or a plastic composition.

It will of course be appreciated that propeller blades are subjected to excessive strains during operation, and this is particularly true of blades that automatically adopt varying degrees of pitch during flight. Considerable difficulty has been experienced heretofore in securing a satisfactory means for attaching a wood or plastic blade to the hub of an airplane drive shaft. Such a device of course must in the first place insure a firm attachment of the blade to the hub, and at the same time must be of light weight and must present a minimum air resistance. Obviously it is desirable to provide a structure that may be readily assembled.

An object of this invention is to overcome the disadvantages of the prior art and to provide a blade attachment or shank that will insure safety and optimum operating efficiency.

Another object of this invention is to provide a shank member which may be securely inserted within a blade and which will afford an attachment for the blade that will withstand the various forces to which the blade is subjected.

A still further object of this invention is to provide a shank that permits the blade to have an airfoil shape in close proximity to the hub, thereby insuring that the blade will serve to cool the engine.

Yet another object of this invention is to provide a metallic shank for a wooden propeller blade that is particularly adaptable for use in a variable pitch propeller.

To accomplish the above and other important objects, my invention in general embraces the concept of a shank mounted in a propeller hub and supporting the propeller blade, which insures a secure attachment of the blade to the hub. More specifically, the shank is provided with an extension which lies within the blade, and that portion of the shank exterior of the blade is reduced, within safe aeronautical practice, to a minimum in order to afford as little air resistance as possible. The extension itself insures a rigid attachment of the blade to the shank, but added securement is afforded by certain pin members extending through a portion of the blade and the shank extension. Furthermore a clamp extending around the portion of the blade housing the shank extension may be employed to give added strength to the attachment. The shank is of such construction that the blade may have an airfoil shape adjacent the hub, whereby the blade may direct a stream of air upon the motor.

Two specific embodiments of my invention are disclosed in the drawings which are appended hereto, and in which:

Figure 1 is a plan view of a wooden propeller blade and one specific form of shank.

Figure 2 is an end view of the blade mounted upon the shank.

Figure 3 is an exploded view of the elements of a wooden blade and the attaching shank.

Figure 4 is a view of the blade and shank mounted in a hub to permit automatic adjustment of the pitch of the blade.

Figure 5 is a view along the line 5—5 of Figure 2 looking in the direction of the arrows.

Figure 6 is a view along the line 6—6 of Figure 5 looking in the direction of the arrows.

Figure 7 is a view along the line 7—7 of Figure 5 looking in the direction of the arrows.

Figure 8 is a view of a modified form of shank and pin.

Figure 9 is a sectional view of a blade mounted upon the shank of Figure 8.

Figure 10 is a sectional view along the line 10—10 of Figure 9 looking in the direction of the arrows.

Figure 11 is a sectional view along the line 11—11 of Figure 9 looking in the direction of the arrows.

Referring to the form of device disclosed in Figures 1–7, and particularly to Figure 3, the shank, designated generally A, consists of a spindle 1 which is mounted within the hub. This spindle is formed of metal and is preferably cylindrical and provided with a recess 2 in order to decrease the weight.

While the invention may be employed to attach a blade B to any type of hub, for purposes of illustration I have shown in Figure 4 the shank mounted in a hub designated generally 3 which permits the blade to automatically vary its pitch with changing conditions of flight. Briefly, the hub is provided with a recess 4 within which the drive shaft is keyed, and the shank is seated within a block 5 that is rotatable within the casing. The longitudinal axis of the blade and shank is disposed at an angle to the axis of rotation of the block 5, and consequently rotation of the block will cause the blade to describe the arc of a cone during which its pitch will vary. It is to be understood, however, that the shank may be used with any type of hub, regardless of whether the hub is for a fixed or variable pitch propeller.

In the form of device shown in Figures 1-7, I preferably employ a flange 6 against which the end of the propeller abuts. It will be noted that this flange is of airfoil section and is set perpendicular to the shank axis. In order to decrease weight, recesses 7 may be cut in the flange, and apertures 8 may extend through the flange to permit the introduction of a liquid filler material into the propeller blade after assembly of the propeller upon the shank. Such apertures are especially desirable when a wooden blade is used and a sleeve is fitted upon the exterior of the blade as will be referred to hereafter. In such case, the injection of the liquid serves to fill any pores in the wood or any crevices that may result during the assembly of the blade and shank.

Extending from the flange 6 is an extension or plate 9 which fits within the end of the blade. The plate 9 is of diminished thickness as compared to the diameter of the spindle 1, and in top plan, as best shown in Figure 5, its sides incline away from the flange 6, thus presenting surfaces which resist any pull exerted on the propeller by virtue of centrifugal force. It will be noted that the plate 9 is provided with a hole 10 therein which is adapted to receive a plug or a pin 11 as will be later described.

I have shown the shank as applied to wooden blades, and it will be appreciated that most wooden blades are made up of laminated strips, by reason of which a particularly ready assembly of my shank and blade is afforded. Referring particularly to Figure 6, I have shown a blade composed of five strips designated generally 12, 13A, 13B, 14A and 14B. The center strip, 12, is cut to form a recess corresponding to the perimeter of the plate 9, and this strip and plate are preferably of the same thickness.

As best shown in Figures 6 and 7, the pin 11 is of greater length than the thickness of the plate 9 and therefore extends beyond the plate surfaces. Strips 13A and 13B are drilled to provide recesses 15A and 15B which are adapted to receive those portions of the pin 11 extending beyond the face of plate 9. It will therefore be noted that the pin 11 affords a support for strips 13A and 13B which, in addition to the support of strip 12 afforded by the plate 9, serves to securely hold the complete blade upon the shank A.

I have also shown a clamp or sleeve 16 which may be fitted around the inner end of the assembled blade B and secured to the flange 6 by spot welding or other suitable means. This band affords additional strength to the assembled blade and shank both insofar as insuring that the several laminations will remain assembled as a unit, and also compresses the wood fibers of strip 12 which lie between the inclined surfaces of the plate 9 and such sleeve. In this latter connection, it will be appreciated that, as a result of centrifugal force, the inclined surfaces will exert a force upon the corresponding surfaces of the recess in strip 12 which, if unresisted, will tend to work the blade free from the shank. The normal strength of the wood fibers in most cases will suffice to prevent any unseating of the plate within the recess of strip 12, but obviously the sleeve 16 will compress the fibers to entirely prevent any tendency toward loosening the fit between the plate 9 and the propeller blade.

In assembling the blade upon the shank, strip 12 is first cut out to provide the recess for plate 9, and strips 13A and 13B are drilled to a depth to receive the pin 11. The contacting surfaces of strips 12, 13A and 13B are painted with a suitable binder, such as glue, and these strips are assembled upon the plate 9 and pin 11. Likewise a suitable binder is applied to strips 14A and 14B which in turn are assembled upon strips 13A and 13B, and the several strips subjected to sufficient pressure for a period of time to insure firm adhesion. The blade is then cut to the desired shape and the sleeve 16 assembled on the blade and flange 6. A filler may be injected into the base of the blade through apertures 8 in the flange 6, and the assembled blade and shank then mounted in the hub which, as previously indicated, may be of any desired type.

While, in Figures 1-7, I have disclosed the use of a flange 6 upon the shank and also the use of a sleeve or clamp 16, I desire to point out that under some conditions one or the other of these two elements, or both, may be omitted.

It will be noted that the use of the shank described above, as well as the form of shank to be next described, allows the blade to be shaped as an airfoil right down to its inner extremity which abuts against the flange 6. By thus providing an airfoil shape adjacent the hub, the blade impels a stream of air upon the engine which, particularly in the case of an air-cooled engine, contributes to the cooling of the engine.

Referring now to the form of device shown in Figures 8-11, the shank designated generally C is made up of a spindle 21 which carries a plate 22. The plate 22 is joined to the spindle 21 by means of a sloping web 23. The plate 22 is, in general, triangular in shape, providing straight and angular shoulders 24 extending from the sides of the web 23. The plate 22 is drilled with a suitable number of holes 25 which, in the case of the device shown in Figures 8-11, are five in number.

I have disclosed a wooden propeller mounted upon the shank C, which, as heretofore described in connection with the first form of device, may be made up of laminated strips 26, 27A, 27B, 28A and 28B. Strip 26 is of the same thickness as plate 22, and a recess is cut therein corresponding to the shape of plate 22. It will be noted that the several strips extend back to abut against the base of spindle 21, and shoulders 24 on the plate, together with the pins which extend through the plate 22, later to be described, serve to maintain the blade securely in place against such base. Pins 29 in the form of tubes fit within the holes 25, and as best shown in Figures 10 and 11, are of a length to extend through the strips 27A and 27B. These strips therefore are drilled to receive such pins prior to the assembly of the several strips to form the complete blade. It might be pointed out that I contemplate an assembly of the several laminated strips in the same way as described above in connection with Figures 1-7.

I have shown a sleeve or clamp 31 surrounding the butt of the blade which serves to afford additional strength to the assembled blade and shank. However, I wish it to be understood that this sleeve may be omitted under certain conditions, particularly where the fiber of the wood and the type of binder is of sufficient strength to withstand all conditions which may be encountered in operation.

It will be noted that in Figures 8-11 no flange is disclosed corresponding to the flange 6 of the first described device, but it should be pointed out that such a flange may be employed if desired.

While I have described my invention with reference to a wooden blade, and while it finds especial application in such a blade, it will be appreciated that either form of shank may be used with other types of blades, and, in this connection, I would mention particularly blades made up from plastic compositions or metals which could not be readily attached directly to the hub.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. In a propeller assembly, a hub, a blade having a root face of airfoil section, and a shank member serving to mount the blade upon the hub, a transverse flange on the shank member for engaging the root end face of the blade said flange having an airfoil shape and size identical with the root face of the blade, and an anchor extending from the flange as an extension of the shank and having a substantially trapezoidal configuration with its shorter parallel side immediately adjacent the flange, said blade having a socket of a configuration identical to that of the anchor, said blade being of laminated construction and assembled about the extension.

2. In a propeller assembly, a hub, a blade, and a shank member serving to mount the blade upon the hub, a transverse flange on the shank member for engaging the root end face of the blade, an anchor extending from the flange as an extension of the shank and having a portion remote from the flange of greater transverse dimension that the portion immediately adjacent the flange, said blade having a socket of a configuration identical to that of the anchor, said blade being of laminated construction and assembled about the extension, and a ferrule surrounding the root of the blade and secured to said flange to prevent lateral expansion of the root of the blade and thereby retain the blade assembled on the anchor.

3. In a propeller assembly, a hub, a blade, and a shank member serving to mount the blade upon the hub, a transverse flange on the shank member for engaging the root end face of the blade, and an anchor extending from the flange as an extension of the shank and having a portion remote from the flange of greater transverse dimension than the portion immediately adjacent the flange, said blade having a socket of a configuration identical to that of the anchor, said blade being of laminated construction and assembled about the extension, said flange having an aperture therein for the injection of a filler fluid into the root end of the blade.

4. In a propeller assembly, a hub, a blade, and a shank member serving to mount the blade upon the hub, a flange on the shank member, and a member extending from said flange, said extension member being securely seated entirely within a recess in the blade and serving to maintain the blade in abutting position against the flange, said flange having an opening therein for injection of a filler fluid into the adjacent end of the blade.

5. In a propeller assembly, a hub, a blade, and a shank member serving to mount the blade upon the hub, a flange on the shank member, an anchor of trapezoidal configuration forming an axial extension of the shank with the shorter of the parallel sides of said trapezoidal anchor adjoining said flange, said blades having a recess in the root thereof of a configuration identical to the anchor for receiving the anchor and maintaining the root of the blade in abutting engagement with the flange.

6. In a propeller assembly, a hub, a blade, and a shank member for mounting the blade upon the hub, an anchor member formed on the shank and constituting an axial continuation thereof, said anchor member having a trapezoidal configuration with its shorter parallel side adjoining the shank, the root of said blade having a socket therein of a configuration identical to that of the anchor for the reception of said anchor, and a ferrule surrounding the root of the blade to prevent lateral expansion of the blade and thereby maintain the blade in intimate engagement with the anchor.

PAUL F. HACKETHAL.